INVENTOR
David Anthony Harris

United States Patent Office

3,300,727
Patented Jan. 24, 1967

3,300,727
PHASE SENSITIVE DETECTORS
David Anthony Harris, Leicester, England, assignor, by mesne assignments, to The Rank Organisation Ltd., London, England, a British company
Filed Feb. 5, 1964, Ser. No. 344,522
Claims priority, application Great Britain, Feb. 15, 1963, 6,155/63
6 Claims. (Cl. 329—50)

This invention is concerned with improvements in or relating to phase-sensitive detectors, and is concerned especially, but not exclusively, with a phase-sensitive detector for use with a precision surface measuring instrument.

According to the present invention there is provided a phase-sensitive detector wherein an input comprising a signal superimposed on a carrier waveform is detected by the use of a reference waveform, and wherein said input is referred to a reference potential over only a part of a cycle of said carrier waveform.

An embodiment of a phase-sensitive detector according to the present invention will now be particularly described hereinafter by way of example with reference to the accompanying drawings, in which.

Figure 1:
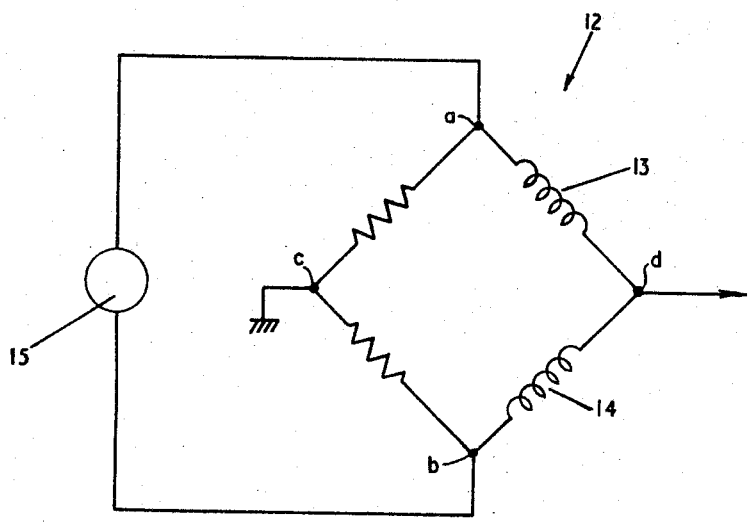
FIGURE 1 is a diagrammatic representation of an alternating current bridge, the output of which serves as the input signal to and is to be detected by the detector.
Figure 2:
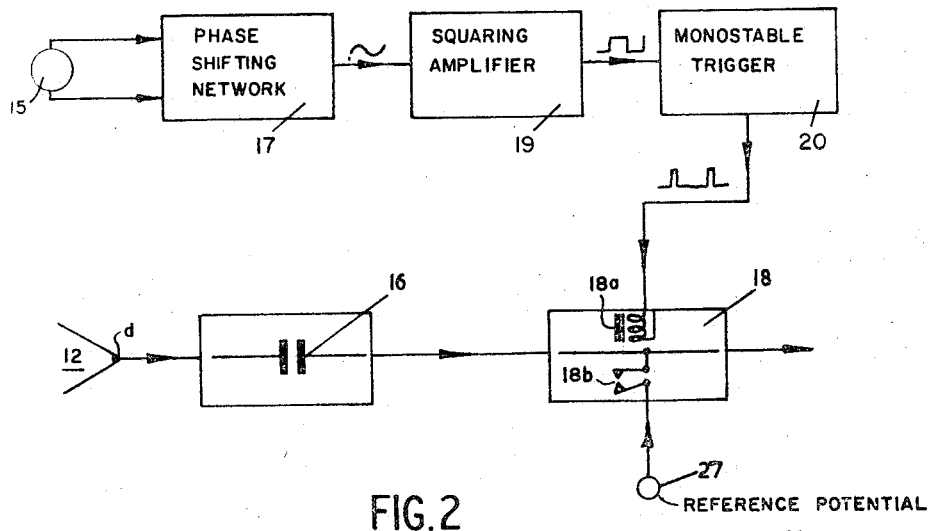
FIGURE 2 is a schematic diagram in block form of the component parts of the detector.

Referring to FIGURES 1 and 2 of the drawings, an alternating current bridge, generally indicated by the reference 12, is used in association with an instrument, not shown, for measuring the surface roughness of a workpiece. The feeler point of the instrument undergoes deflection as it passes over the surface of the workpiece, and these deflections serve to produce a corresponding variation in the value of inductances 13 and 14 attached to the feeler and which form two arms of the A.C. bridge 12. The input terminals $a$, $b$ of the bridge 12 are connected to an oscillator 15 generating a carrier waveform, and the amplitude of the waveform is modulated by having a signal corresponding to changes in the value of the inductances 13 and 14, superimposed on it so that a modulated carrier waveform is present at the output terminals $c$, $d$ of the bridge 12. The invention is concerned with the detection, also called demodulation, of the modulated waveform, that is to say with the recovery from the modulated wave of a voltage or current which varies in accordance with the modulation present on the wave.

One output terminal $c$ of the bridge 12 is connected to ground, while the other output terminal $d$ is connected to the detector, shown in FIGURE 2, where it first passes through a direct current isolator element 16 comprising a capacitor.

Simultaneously a reference signal in the form of a reference waveform is taken from the same oscillator 15, and is supplied to a phase shift network 17 of the detector, to operate a clamping device 18 comprising a switch element which in FIG. 2 has been simply illustrated as a relay having a coil 18a and a single set of make contacts 18b. The clamping device 18 is made to operate at predetermined intervals by means of short pulses, that is to say by pulses which are short compared with the period of a cycle of the reference signal. The short pulses are produced by passing the reference signal through a squaring amplifier 19, which changes the waveform of the reference signal from a sinusoidal one to a rectangular waveform. An edge of this waveform is then used to trigger a monostable device 20, whereby the desired pulses are obtained every time a leading edge of the square waveform appears. The squaring amplifier 19 is an overdriven common emitter amplifier comprising transistor 19a having a base input and a collector output circuit 19b. The monostable trigger 20 is a conventional emitter coupled monostable comprising the two transistors 20a, 20b.

Figure 3:
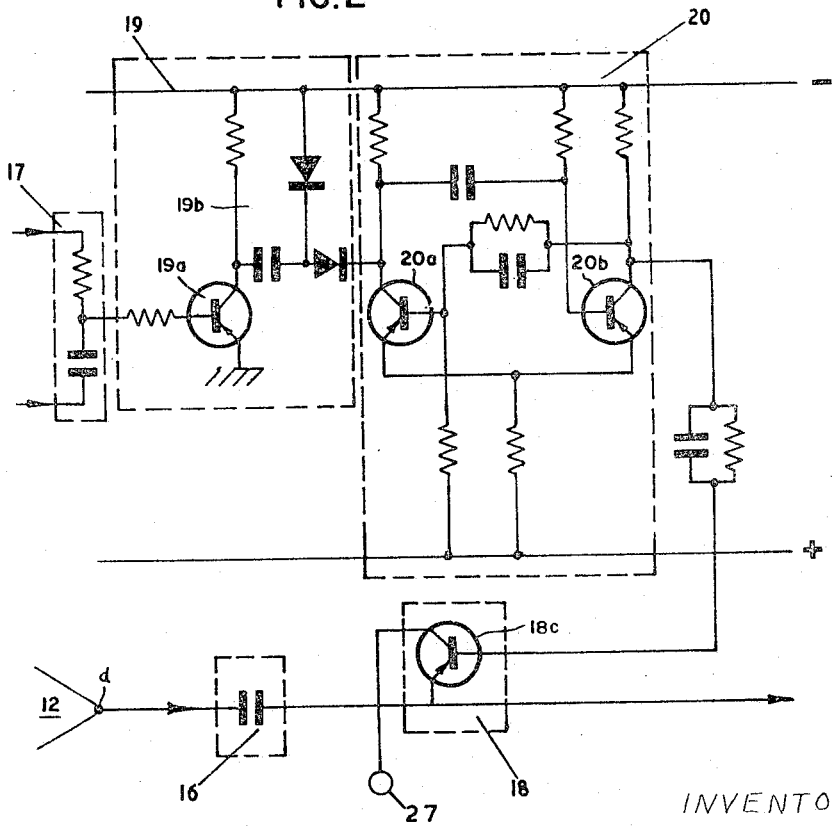
FIGURE 3 is a schematic diagram of the same detector, showing the various circuit elements included in the blocks of FIGURE 2.

The clamping device 18 is consequently switched on by a pulse, and clamps, that is to say connects, the signal from the output terminals of the bridge 12 by way of the D.C. isolator element 16 to a reference potential 27. The reference potential in this embodiment is ground potential. FIG. 3 illustrates the clamping device 18 in the form of a transistor 18c which is made to serve as a switch by on/off control of its base current. With the absence of any base current (cut-off), transistor 18c exhibits a high impedance between its emitter and collector. However, when appreciable base current is applied, this impedance falls to a very low value.

During the clamping time the D.C. isolator element 16 is charged to a voltage equal to the difference between the signal voltage and the reference potential 27. When unclamped, that is to say disconnected from, the reference potential 27, the output voltage of the detector is displaced by the aforesaid amount, and remains displaced by the charge built up on the capacitor 16 during the remainder of the period.

In operation the apparatus is used when it is desired to determine the intergral of a curve relative to a reference level.

Figure 4:
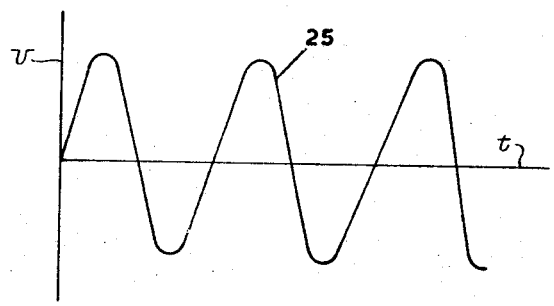
FIGURE 4 is a graphical representation, on the same time scale, of the conditions of the waveforms at various points in the detector.
Figure 4:
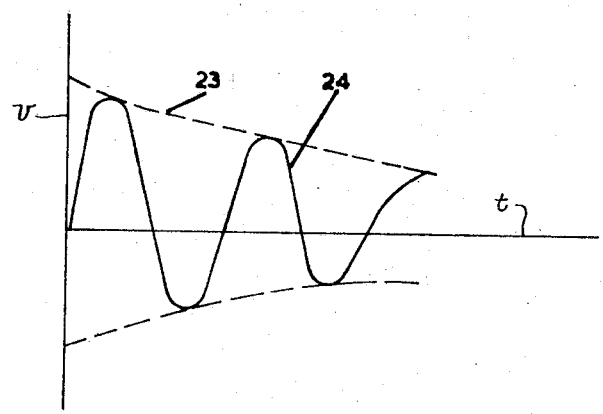
Figure 4:
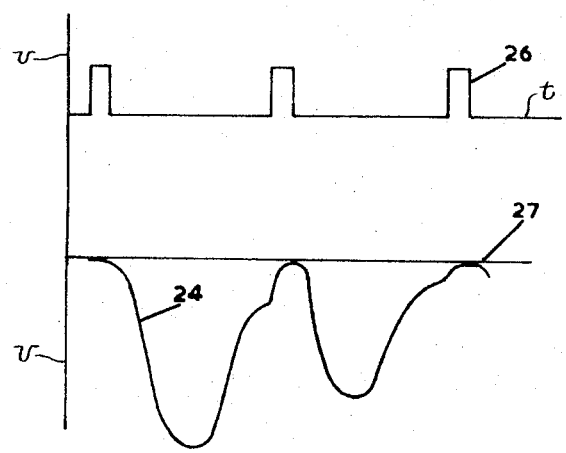

Referring to FIGURE 4 of the drawings, wherein the various voltage waveforms are plotted with the amplitude $v$ as ordinates against an abscissa $t$ as a function of time the modulation may comprise a signal waveform 23 having a frequency less than that of the carrier superimposed on the carrier waveform 24. The oscillator 15 supplies the reference signal waveform 25, which has the same frequency as that of the carrier waveform 24. The reference signal waveform 25 is fed to the phase shifting network 17 as hereinafter described so that clamping can be adjusted to take place at the desired instant of time. Clamping is adjusted to give the optimum reading required for measurement purposes. The clamping device 18 connects the signal 24 from the output terminals of the bridge 12, supplied through the D.C. isolator element 16, to the reference potential 27, which in this case is ground, for the duration of the short pulse from the monostable device 20.

During this time the capacitor of the D.C. isolator element 16 is charged to a voltage equal to the difference between the signal and the reference voltage during the time of switching. This process is illustrated in the lowermost diagram of FIGURE 4, where the switching pulses 26 are shown at the appropriate place along the abscissa which represents time. The resulting course of the signal carrier waveform 24 at the output of the clamping device 18 is also shown. Both are plotted against the reference potential 27. It will be seen that the output voltage 24 remains displaced by a charge built up on the capacitor of the D.C. isolator element 16.

At the end of the short duration pulse 26, the output 24 follows the original signal, but displaced in potential by the amount corresponding to the difference between the signal voltage 24 and reference voltage 27 at the moment of switching.

The signal fluctuating about the reference level is now integrated by integrating means, not shown, which may comprise a filter, with respect to the reference level 27, whereby a measure of the amplitude of the component of the signal 24 emerging from the bridge which is in phase with the reference waveform 25 is obtained. This amplitude of the in-phase component can be shown on an indicating instrument.

It will be appreciated that because of the particular arrangement of the circuit of the detector, it is desirable that the signal source impedance be kept as low as possible.

Alternative constructions of the detector according to the present invention may also be provided. For example, reference potentials other than ground can be used. Also, the carrier waveform 24 may be in phase with the reference signal 25, or it may be out of phase. In either case, the value of the in-phase component of the signal is obtained by the detector. Furthermore, the reference potential 27 need not be constant, but may fluctuate.

It will be appreciated that whereas the phase-sensitive detector according to the present invention has been described hereinabove in its application to a precision measuring instrument, it may also be used in other applications. For example, it may be used as a demodulator in a gauging system, or using two such devices working in combination, a Resolved Components Indicator may be made. The detector according to the present invention may also be used for forming the difference between two frequencies, i.e. as the first detector in a superheterodyne system. Two such devices may also be used in a system to facilitate the rapid balancing of an A.C. bridge by displaying the resistive and reactive components on separate meters.

It will be appreciated that some of the advantages of the phase-sensitive detector according to the present invention are good linearity, high accuracy, and substantially complete freedom from drift.

I claim:

1. A phase-sensitive detector for an input constituted by a signal superimposed upon a carrier waveform, said detector comprising means establishing from said carrier waveform a reference waveform of the same frequency as said carrier waveform, means producing from said reference waveform a series of pulses, a monostable device triggered by said pulses, means providing a reference potential and clamping means controlled by said monostable device so as to clamp said input to said reference potential once during each cycle of said carrier waveform and over only a part of each cycle of said carrier waveform.

2. A detector as claimed in claim 1 in which said pulse producing means comprises a squaring amplifier.

3. A detector as claimed in claim 2 wherein said input is referred to said reference potential by the intermediary of direct current isolator means, said isolator means being connected intermediate said input and said clamping means and including capacitive means, wherein the output of said detector is displaced by a predetermined value after reference and remains displaced for the remainder of said cycle.

4. A detector as claimed in claim 3 and including phase-shifting means connected intermediate said reference waveform and said squaring amplifier for controlling the instant of time at which said input is referred to said reference potential.

5. A phase-sensitive detector for an input constituted by a signal superimposed upon a carrier waveform, said detector comprising means establishing from said carrier waveform a reference waveform of the same frequency as said carrier waveform, means producing from said reference waveform a series of pulses, a monostable device triggered by said pulses, means providing a reference potential, clamping means controlled by said monostable device so as to clamp said input to said reference potential once during each cycle of said carrier waveform and over only a part of each cycle of said carrier waveform, and direct current isolator means connected intermediate said input and said clamping means whereby the output of said detector is displaced by a predetermined value after reference and remains displaced for the remainder of said cycle.

6. A phase-sensitive detector for an input constituted by a signal superimposed upon a carrier waveform, said detector comprising means establishing from said carrier waveform a reference waveform of the same frequency as said carrier waveform, means producing from said reference waveform a series of pulses, a monostable device triggered by said pulses, means providing a reference potential, clamping means controlled by said monostable device so as to clamp said input to said reference potential once during each cycle of said carrier waveform and over only a part of each cycle of said carrier waveform, and phase-shifting means connected intermediate said reference waveform and said pulse producing means for controlling the instant of time at which said input is referred to said reference potential.

References Cited by the Examiner

UNITED STATES PATENTS

| 2,864,954 | 12/1958 | Byrne | 328—134 X |
| 2,988,695 | 6/1961 | Leavitt | 324—79 X |

ROY LAKE, *Primary Examiner.*

ALFRED L. BRODY, *Assistant Examiner.*